(12) United States Patent
Schneider

(10) Patent No.: US 10,864,958 B2
(45) Date of Patent: *Dec. 15, 2020

(54) MULTI-USE, THREE-WHEEL, PORTABLE, QUICK ASSEMBLE, DISASSEMBLE VEHICLE METHOD THEREOF

(71) Applicant: Jeffrey Schneider, Windsor, CA (US)

(72) Inventor: Jeffrey Schneider, Windsor, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,951

(22) Filed: Jan. 16, 2018

(65) Prior Publication Data
US 2019/0217912 A1 Jul. 18, 2019

(51) Int. Cl.
*B62K 5/025* (2013.01)
*B62K 5/06* (2006.01)
*B62M 7/12* (2006.01)
*B62K 5/027* (2013.01)
*B62J 43/00* (2020.01)

(52) U.S. Cl.
CPC ............. *B62K 5/025* (2013.01); *B62K 5/027* (2013.01); *B62K 5/06* (2013.01); *B62M 7/12* (2013.01); *B62J 43/00* (2020.02); *B62K 2204/00* (2013.01)

(58) Field of Classification Search
CPC .......... B62K 5/025; B62K 5/027; B62K 5/06; B62K 2204/00; B62M 7/12; B62J 43/00
See application file for complete search history.

(56) References Cited

U.S. PATENT DOCUMENTS

| | | | | |
|---|---|---|---|---|
| 3,605,929 A * | 9/1971 | Rolland | ................ | B62D 61/08 180/208 |
| 4,909,525 A * | 3/1990 | Flowers | ................ | B62D 21/12 180/210 |
| 5,020,624 A * | 6/1991 | Nesterick | ............... | B62K 5/025 180/208 |
| 5,036,938 A * | 8/1991 | Blount | .................. | B62D 61/08 180/208 |
| 5,064,209 A * | 11/1991 | Kurschat | ................ | B62K 5/025 280/204 |
| 5,090,513 A * | 2/1992 | Bussinger | .............. | B60K 28/04 180/271 |
| 5,228,533 A * | 7/1993 | Mitchell | ................ | B62D 61/08 180/208 |
| 5,848,660 A * | 12/1998 | McGreen | ............... | B62K 3/002 180/220 |
| 6,170,592 B1 * | 1/2001 | Wu | ........................ | B62D 21/12 180/208 |
| 6,176,337 B1 * | 1/2001 | McConnell | .............. | B62D 1/14 180/208 |
| 6,378,642 B1 * | 4/2002 | Sutton | ................... | B62D 61/08 180/208 |

(Continued)

*Primary Examiner* — Laura Freedman
(74) *Attorney, Agent, or Firm* — Tatonetti IP

(57) ABSTRACT

A three wheeled stand-up or sit down portable two part personal mobility vehicle suited to fulfilling the needs of a broad spectrum of drivers including the handicapped having walking disabilities and recreational users. The vehicle is configured to easily fold and collapse without the use of tools to thereby provide a convenient way for all people, including the handicapped or those lacking normal strength, to handle and store their vehicle. The folding mechanism is implemented with the steering column of the vehicle and enables the handlebar assembly to easily fold downward.

5 Claims, 10 Drawing Sheets

(56) References Cited

U.S. PATENT DOCUMENTS

| | | | |
|---|---|---|---|
| 7,044,249 B2 * | 5/2006 | Fan | B60D 1/00 |
| | | | 180/208 |
| 7,234,557 B2 * | 6/2007 | Chen | B62K 5/025 |
| | | | 180/208 |
| 7,363,998 B2 * | 4/2008 | Fan | B62K 5/025 |
| | | | 180/208 |
| 9,174,692 B2 * | 11/2015 | Treadway | B62K 15/00 |
| 2019/0225294 A1 * | 7/2019 | Schneider | B60L 50/64 |

* cited by examiner

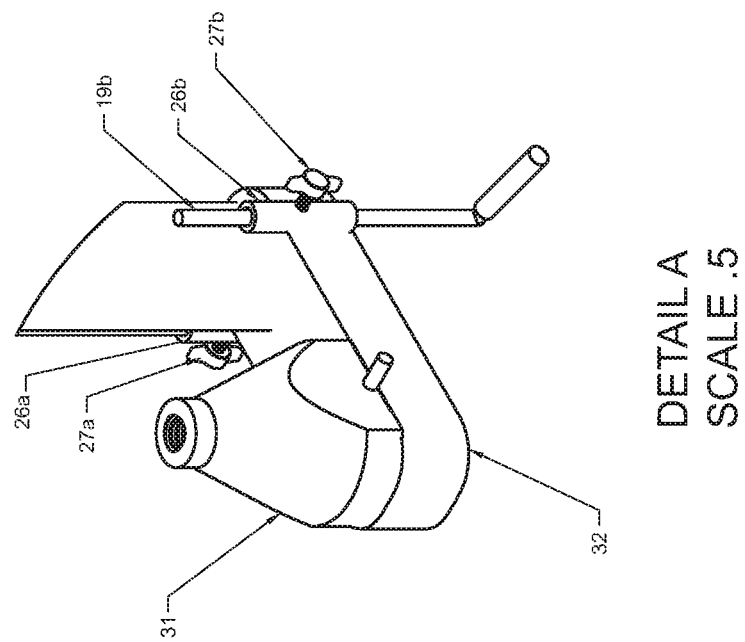
DETAIL A
SCALE .5
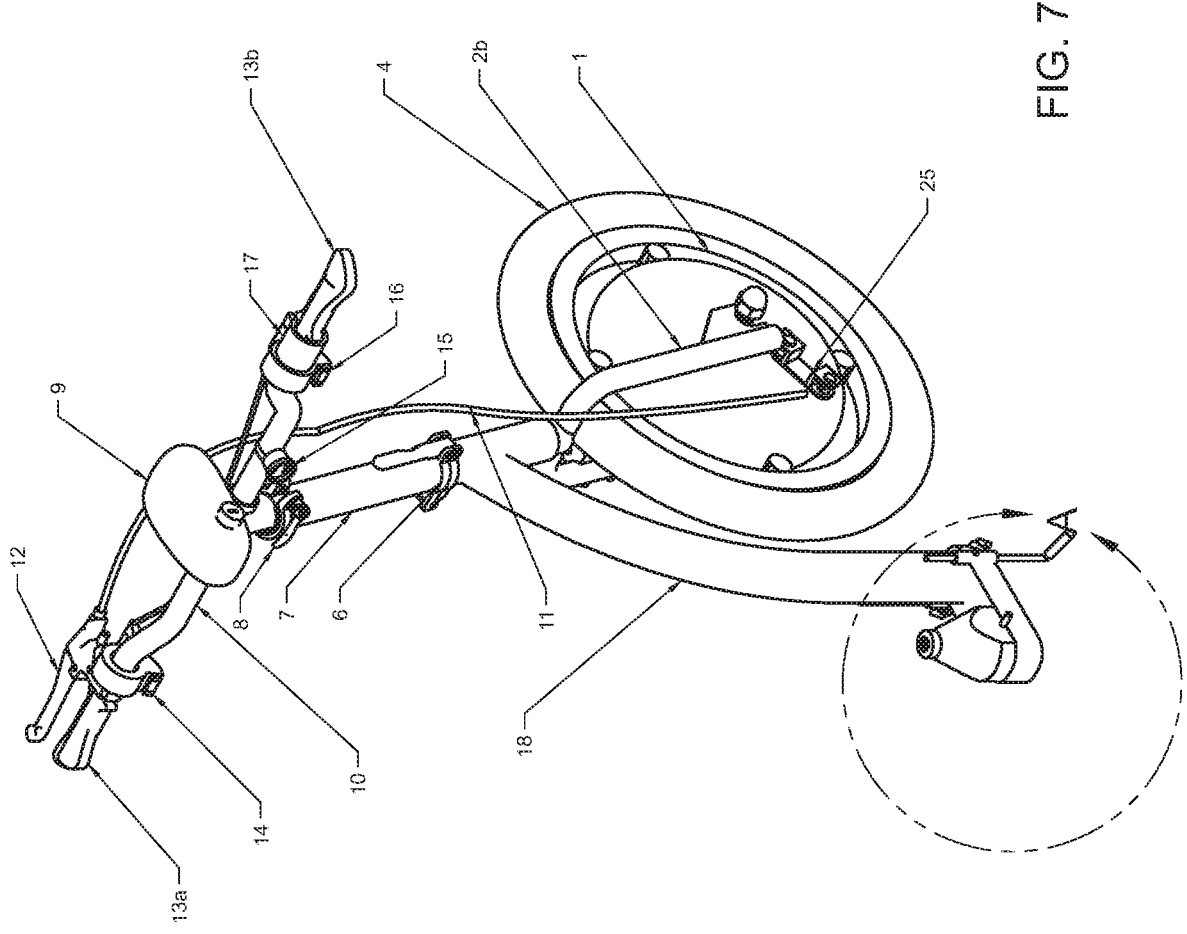
FIG. 7

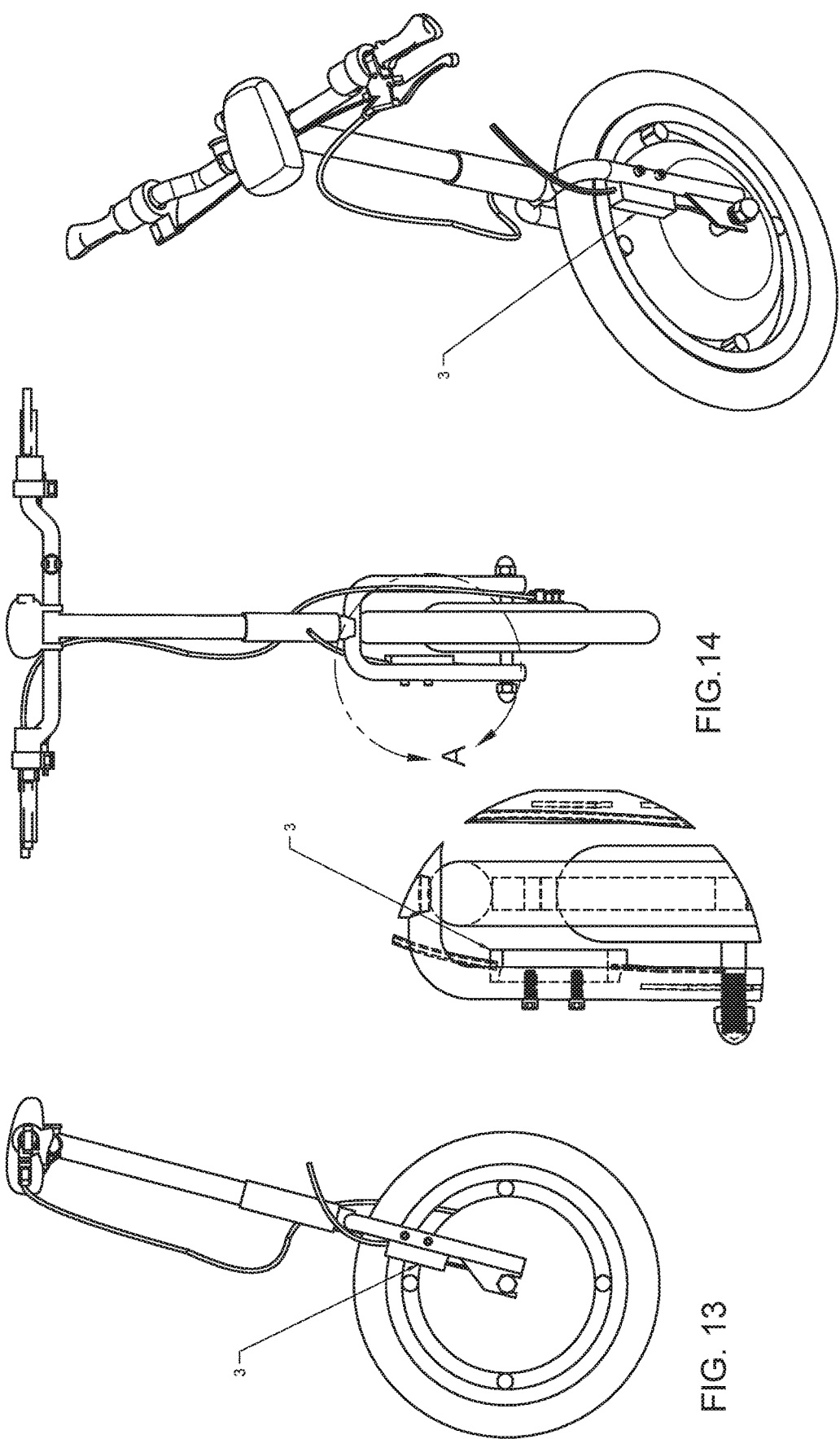

MULTI-USE, THREE-WHEEL, PORTABLE, QUICK ASSEMBLE, DISASSEMBLE VEHICLE METHOD THEREOF

BACKGROUND OF THE INVENTION

1. Field of the Invention

The present invention relates to vehicles and methods of electric mobility transport for transporting individuals providing a choice to either stand or sit and addresses the needs of a broad spectrum of users. The present invention will benefit individuals with walking disabilities, leisure/recreational users, and industrial/commercial users, and more particularly, to portable, vehicle and methods of assembling and reassembling, a steering assembly and rear chassis wherein, without the use of tools, a conical coupling assembly and a steering assembly stand system is used.

The present invention also includes major components designed to easily fold, collapse, or remove without the use of tools, and whereas the components are in the size and weight so as any person of modest physical strength may be capable of handling the individual components to the point where the mobility vehicle may fit into various size storage compartments or vehicles from large and small.

2. The Prior Art

Over the past 20-30 years, many types of mobility vehicles have been developed for facilitating the movement of individuals. Initially, a majority of these vehicles were designed for transporting individuals with disabilities that hindered their ability to walk or stand. In the USA alone, The Centers for Disease Control and Prevention estimated that 33 million Americans have a disability that makes it difficult for them to carry out daily activities; some have challenges with everyday activities, such as attending school or going to work, 2.2 million people in the United States depend on a wheelchair for day-to-day tasks and mobility, and 6.5 million people use a cane, a walker, or crutches to assist with their mobility.

Assuming there is a population of 2.2 million confined to using the "traditional" old style wheel chairs comprising 2 large wheels in the back and two smaller wheels in the front, we still have a population of 35.2 million Americans that can benefit from a more versatile mobility vehicle. As electric mobility vehicles or EMV's attempted to adjust for the needs of the other 35.2 million Americans with mobility disabilities, many slow and bulky mobility vehicles were designed and improved upon to give individuals without extreme disabilities a way to get around with a little more dignity. These 3 and 4 wheeled slow, bulky mobility vehicles have served their niche and thousands have been sold. But for many individuals, they are just that, slow-bulky- and hard to transport in a vehicle. They also still connotate a negative image of the rider being handicapped. Most handicapped people do not want pity nor wish to look up at someone who is standing while they are sitting in a mobility vehicle that looks like a disability vehicle.

The need to transport these slow bulky mobility vehicles did not go unnoticed and many designs came out to try and make them easier to transport. However, the shear nature of the bulky design and size of these vehicles made disassembly and reassembly of these large components tricky, time consuming, and almost impossible if someone of modest physical strength were to attempt to break them down.

This led to expensive and at times undesirable alternative fixes for the transport of mobility vehicles such as external carriers and lifts mounted outside cars and trucks. Other alternatives to make EMV's easier to transport were to make them smaller and thus easier to transport. Unfortunately, these small and lightweight EMV's tended to be structurally designed to only handle very low speeds and typically required the driver to stand. In addition, small size and light weight caused the EMV to be more unstable.

As technology advanced electric mobility vehicles were repurposed to not only cater to the disabled, but also toward leisure and increased work efficiency. One of the first commercially launched electric mobility vehicles was the 2 wheeled scooter which was a stand up and balance type of vehicle and not viable for most disabled individuals. It was mostly used for recreation but legitimized electric mobility vehicles of many configurations as well. EMVs started to become sleeker and faster appealing to the younger generation. It is prudent to note that many of these new fun mobility scooters evolved with numerous patents and designs for folding as a means to transport them easily thus solidifying the idea that transport of mobility scooters was a big issue. This segment of EMV's moved on to a now multi-million-dollar industry. The use of EMV's was now being used for the disabled, for recreation, and then commercial uses materialized.

It did not take long for commercial applications to evolve for EMV's. In the past, workers who had to cover large distances in the work place had to either walk, or if they were lucky, drove a motorized golf cart to save time and energy. As of May 2017, the United States Department of Labor estimates there are approximately 952,000 warehouse workers in the USA alone. They also estimate that the average hourly wage was $19.63/hour for these workers. Many businesses now realize that the time saved moving employees around faster, increases productivity and the use of smaller EMV's that can pass through doorways and other tight spaces is invaluable. Attach a trailer to the EMV and it functions as a personal work-truck, hauling products around facilities quickly and efficiently. The need for EMV's in industrial settings spawned designs that were heavy and bulky which limited their use solely for industrial purposes.

Other commercial personal transporter applications unfolded in the form of rental tours, police, security guards, mail carriers, and others. These were mainly exploited by expensive and highly sophisticated EMV's like the two wheeled self balancing Segway. However, expensive EMV's were cost prohibitive to a large portion of the commercial market. In addition, both the simple two wheeled kids type scooters and the highly complicated self-balancing EMV's like the Segway require the ability to balance, stand, or possess cognitive skills excluding most individuals with disabilities.

As EMV's evolved, it became clear that most of the prior art tended to focus themselves in one of these three categories (people with disabilities, recreation, commercial uses) and while some EMV's uses may fall between one or two of these categories, most of them really do not fit into all three. In addition, most of the prior art sacrifice something in their designs. The prior art of the smaller and lighter three wheeled EMV's that claim easy folding or assembly are slow and sacrifice stability, while ironically, their target audience is typically old or disabled and more prone to balance issues. Though a three wheeled platform is considered stable, it can still tip easy because a user standing or sitting on a light weight platform tends to distribute the weight from a low center of gravity to a high center of gravity which reduces stability. Whereas heavier and larger EMV's are more anchored to the ground through a low center of gravity. It should also be noted that the prior art of most of the light weight EMV's and some heavier ones incorporate small diameter wheels which can be dangerous on potholes and uneven surfaces. On the flip side, the prior art of many heavier and larger EMV's, though more stable than super light vehicles, sacrifice easy assembly/disassembly to store or transport in cars, RV's, planes, etc.

For these and other reasons, this new and novel invention is aimed at resolving and addressing numerous disadvantages of the prior art presenting a stable platform that can cross the boundaries of all three of the above target groups with significant advantages and improvements so as to appeal to a majority of the users that can benefit from EMV's.

SUMMARY OF THE INVENTION

In the embodiment of the present invention, it is provided an electric personal vehicle that is commercially viable to not only fulfill the needs of people with walking disabilities, but also crosses over to leisure, and industrial applications, and whereas the user may stand or sit at any chosen time.

It is therefore one objective of this new invention to present a three-wheel, multi-use, portable, battery powered electric vehicle.

In a related embodiment, the present invention comprises two major parts. a front major part comprising a steering assembly and a rear major part comprising a chassis.

In a related embodiment, the further objective of this invention is to present two major parts in which size and weight of each major part may be easily loaded, unloaded, transferred, or stored into most car/suv trunks, RV's, planes, trains, buses, or buildings.

In an alternative and related embodiment, this invention comprises five major parts: First, a folding steering column, Second, the steering assembly, in which the folding steering column is attached, Third, the a chassis in which Fourth, a detachable seat and seat post, and Fifth, a self-contained and removable battery box are integrated to further allow this invention to rapidly break down into smaller and easier components increasing versatility by fitting in vehicles of many sizes and addressing issues for those with limited strength.

It is another objective of this new invention to present a newly developed method connecting mechanism based on a male to female conical coupling assembly, applied for the first time on an EMV. Unlike any of the prior art, the conical coupling design allows for coupling without the need to vertically align the steering assembly to the chassis in a perfect vertical position. The conical coupling assembly comprises an upward vertical facing conical male end comprising a centered vertical female threaded hole and couples with a respective downward facing female receiving end. The downward facing female receiving end is machined to fit the upward vertical facing conical male end. The internal architecture of the downward facing receiving end ensures that the coupling assembly will lock tightly in place and in the correct position. The upper of the female receiving end comprises a threaded hole wherein the upper of the upward vertical facing conical male end bottoms out inside the upper of the female receiving end.

In a related embodiment of the conical coupling assembly, it is a further objective to present a newly developed double ended hand screw wherein it either secures or separates the conical coupling assembly. The double ended hand screw comprises a narrower threaded male end, comprising a wider threaded male end opposing the narrower threaded male end, comprising a cylindrical disc separating the opposing narrower threaded male end from the wider threaded male end, comprising a U-shaped handle pivotally mounted to the cylindrical disc. When the conical coupling assembly is coupled and the double ended hand screws' narrower threaded male end is screwed into the upper of the upward vertical facing conical male end, it tightly secures the upward vertical facing conical male end to the downward facing female receiving end. Conversely, when the double ended hand screws' wider threaded male end is screwed into the threaded hole of the downward facing female receiving end, applies downward pressure against the upper of the upward vertical facing conical male end, thus releasing and separating the conical coupling assembly. The U-shaped handle of the double ended hand screw pivots on bushings and acts as a lever for tightening and loosening and then lies flat on the floor deck. Additionally, the length of the U-shaped handle is in a dimension wherein should the double ended hand screw loosen during vehicle use, it makes contact with the steering assemblies rear and downward facing curved support member.

In yet another related embodiment, it is presented here a stand system that allows for the steering assembly to stand freely and independently from the chassis. The stand system may comprise two adjustable telescopic legs at the lower of a steering assemblies rear and downward facing curved support member, wherein the front wheel of the steering assembly and the telescopic legs form a triangular stand; or, the stand system comprises an upside down, spring tensioned, T-shaped kick stand instead of the telescopic legs. The horizontal bar of the T-shape kick stand provides footing on the ground when extended and then folds back under the chassis when not in use. Either stand system frees the user's hands to manipulate the chassis into coupling position and more importantly, while the user is standing upright rather than in a dangerous bent over stance. In addition, it relieves the user from balancing the steering assembly with one hand and while attempting to align and couple the chassis to the steering assembly with the other hand.

In yet another related embodiment, it is presented hear, a rectangular electric controller wherein the controller mounts flush to a fork of a steering assembly. A side of the electric controller comprises a rabbet joint wherein it mounts flush to a steering fork of a steering assembly with a respective rabbet joint. Additionally, mounting an electric controller on the steering assembly keeps most of the electronics accessible for easy repairs and leaves only a single power connector to disconnect from a battery when uncoupling a steering assembly from a chassis.

It is also another objective of this invention to present in its preferred embodiment, a versatile standing, sitting, or combination thereof EMV, whereas the easily removable seat and seat post is placed at a distance on the floor deck to allow users to stand or sit without the need to adjust or remove the seat. In addition, the seat post is removable without tools and when removed, provides extra floor space for storage or to make stowing or transport in another vehicle easier.

A further objective of this new invention is to present a highly maneuverable vehicle that may be used indoors or outdoors, may fit through a standard size doorway, has a speed, range, and frame strength to not only function for users with walking disabilities, but functions for users who will use it for leisure, or commercial/industrial purposes.

In Conclusion, it is presented here an electric mobility vehicle with all combined features no other EMV had presented making it novel, useful, and functionable for the users described herein.

It should be noted that after viewing the prior art, many are written in such a way as to just secure a patent and do not present commercially viable or functional vehicles, which is a waste of time. To differentiate themselves to patent, some prior art limited inventions to focus on narrow segments of populations by designing EMV's for users to only stand and some limit users to only sit. Some prior art is impractical and will never be brought to market while some of the prior art was designed with thought of appearance. Why is it that an EMV must be designed solely to cater to either the walking impaired, or towards recreational users, or to industrial uses? If disabled users may safely use and ride on the same platform as recreational EMV users, why would they want to stigmatize themselves by driving an EMV that is made just for the disabled? Why does an EMV designed for industrial uses need to be large heavy and bulky to be used in warehouses, security, etc.? Due to the fact that this novel and useful invention functions for all three populations discussed here, it is not only more commercially viable, but it has a better chance at success in the market.

Thus, the numerous novel features and characteristics of the new invention presented here, and which are explained more broadly below, make a significant change and improvement in the currently known EMV's for the groups of populations described herein.

Moving forward, with all features combined, this invention comprises two major parts and two minor parts.

The first major part is the front half of the EMV or the front steering assembly combined with a motor assembly comprising a steering handle mounted on a steering column. The steering handle comprising left and right handle grips, comprising a twist throttle with a forward and reverse button on one handle side to regulate speed and direction of the EMV by sending a signal via electrical wire to a central instrument junction box, which in turn connects to an electric controller—the electric controller which is interconnected with a battery, will send metered amounts of electricity or polarity to the motor-A steering handle comprising; a USB charge port for users to charge phones, tablets, etc. connects to a central instrument junction box wherein it interconnects with an inverter and a battery comprising; a hand brake mounted on a steering handle opposite the handle of a twist throttle and connected to brakes on a motor assembly via a brake cable comprising; a horn button on the same side of the steering handle as the hand brake and electrically connected to a central instrument junction box—A central instrument junction box comprising; a box mounted on an upper of the steering column wherein the instrument comprises a key ignition, LED headlights, a horn, a display indicate if ignition is on, warning lights, and a batteries state of charge.

Moving down, the steering handle which may be telescopically adjusted, slides into the upper of a steering column folding structure and is secured in the desired height with the use of an eccentric clamp. The steering column folding structure comprises an eccentric clamp at the upper of the steering column folding structure to secure the handlebar height, a pivoting hinge with a locking clamp lever at the lower of the structure and is semi permanently mounted to the lower steering assembly wherein the handlebars, combined with the steering column folding structure, may fold downward. Though not a new idea, a folding handlebar is the first part of making an EMV easily storable or transported in a vehicle. A user simply unlocks the pivot hinge clamp and folds the steering column with handlebars down-now the EMV will fit in most hatch backs and SUV vehicles, plus it may be stored in tighter areas such as under shelves in a garage. This feature alone may be all that some users will need, but by itself, limits other users who need and want even more versatile transportation.

A hollow, rear downward facing curved support frame member, extends back and downward from the steering assembly and towards the ground comprising a pathway through the rear and downward facing curved support frame member for electrical power wires to couple an electric controller with a battery. Left and right steering forks extend downward from below the folding structure of the steering assembly comprising, a notched rabbet joint on a fork, comprising an electric controller with a respective rabbet joint wherein the electric controller mounts flush to a fork. The electric controller comprises a processor to control the EMVs functions, an electrical connector at the upper of the electric controller for connecting the wires from an instrument junction box which interconnects to a battery, an electrical connector at the lower of the electric controller, connecting a pathway to power a motor. The electric controller with rabbet joint coupled to a steering fork with rabbet joint is an important invention for EMVs for a number of reasons. Firstly, it simplifies the assemble and break down. It is important to note that for an EMV to truly be quick and easy to take apart, the fewer the wires and connections between a steering assembly and a chassis the better. Most of the prior art bury the electric controllers and other electrical and mechanical parts in the back half of the EMV requiring numerous parts to disconnect when breaking down the EMV into manageable sections. Most prior art that show components located on the front half, chose to use bulky and poorly engineered ways to integrate those components. Second, diagnostic and repair-because the electric controller (like most of the other components on the front steering assembly) is mounted so accessible, it is easy to test and replace without taking apart much of the EMV. Third, the rabbet joint controller mounts seamlessly using what was otherwise wasted space and blends in with no unsightly boxes or mounting structures. In its preferred embodiment, the controller has a two-speed limiter button to limit top speed to 8 mph in one setting or up to 16 mph in full speed setting so users who require speed limitations have that choice. Now continuing past the electric controller to the lowest of the steering fork legs-the left and right steering forks comprise brackets to mount the respective left and right axles of the electric hub motor wheel assembly.

Continuing with the summarization of the front major part presented here; referring to the lower end of the rear and downward facing curved frame support member. In the preferred embodiment, a stand assembly is applied to further simplify connection of the front major part of the EMV to the back major part and comprises vertical tubes respectively mounted on the left and right lower of the curved support frame member. Each tube comprises a threaded horizontal hole in which a wing screw may be screwed in, to secure left and right "L" shaped telescopic legs that fit through each respective vertical tube. Or, the stand assembly can be a spring tension kick stand comprising, an upside-down T shaped assembly wherein the horizontal part of the T-shape contacts the ground when extended down and folds back under the chassis when not in use. The telescopic stand assembly or the kick stand assembly address problems with the prior art. The problem with assembly and break-down of an EMV is the users' ability to easily line up the coupling components. Typically, the user must lift one section of an EMV with one hand and then lift another section with the other hand manually aligning the components to fit. Depending on the size, shape, and weight, of the EMV and type of coupling system, the process can be time consuming, clumsy, and possibly an impossible feat. Additionally, the process may cause injury to users-the user may need to bend or contort into dangerous positions in order to complete the coupling. Probably used for the first time on an EMV, a stand mechanism for a steering assembly allows the user to quickly and easily stand the front major part of the invention presented here at a correct and stable height, wherein the rear major part may be effortlessly coupled to the front major part.

In yet another embodiment, of the invention, though not preferred, the stand assembly is not used to stand the steering assembly and the user must align the front major part with the rear major part using one hand to hold the front while using the second hand to align the rear.

The final component of the front major part is a three-part conical coupling assembly. In the preferred embodiment, the special conical coupling assembly is applied for coupling the two major parts of the invention into a complete vehicle. The first two parts attach to the front major part and the third part attaches to the back major part of the invention. The first part of the conical coupling assembly comprises a sturdy hollow beam that is horizontally attached to the lowest of the rear and downward facing curved frame support member, and with a longer of the beam facing towards the back. The second part comprises an upward vertical facing conical male end attached to the upper and rear of the horizontal hollow beam comprising, a vertical threaded hole machined through the center of the upward vertical facing conical male end, and wherein the lower of the upward vertical facing conical male end comprises respective left and right horizontal alignment pins. In the preferred embodiment, the upward vertical conical male end and a downward facing female receiving end have respective left and right chamfered sides in its architecture, or it can also function as a circular cone without the chamfers. The hollow beam provides a protected pathway for electrical wires to pass from the front major part to connect to a battery of the back major part. Additionally, at the point where the hollow beam attaches to the hollow rear and downward facing curved frame support member, there is an opening completing a protected pathway for the electrical wires to connect to the instrument junction box. The third part of the conical coupling assembly will be described in the second major part.

The second major part of the EMV presented here is the back of the vehicle which is the rear chassis assembly in which the user may stand or sit while driving the EMV. The chassis comprises a metal rectangular frame constructed of square or round tubing with three cross members. The first two cross members, besides providing strength and rigidity, are spaced apart wherein a battery housed in removable box (minor part 1 to be discussed later) rests in a metal strap basket housing recessed under the frame, wherein the top of the removable battery box is flush with the upper of the frame. The second and third cross members are spaced apart to allow a seat post (minor part 2 to be discussed later) mounting bracket to be placed in the center rear of the chassis assembly comprising a rectangular plate with four threaded holes placed at the four corners of the plate and comprising a cylindrical female receiving tube in the center of the rectangular plate.

An axle is mounted under and towards the rear of the chassis wherein respective left and right wheels are mounted. Accordingly, the platform that the user stands on comprises a plastic injection molded deck coupled to the upper frame with screws and covers the frame chassis, and comprises mud guard fenders over the rear wheels, a rectangular opening over the battery box wherein the battery box may be removed, a rectangular opening to allow a seat post to be installed and removed, and a circular vertical opening at the center front of the chassis to allow for the fastening of the conical coupling assembly.

Coupled to the top of the plastic deck comprises a durable, slip resistant, removable rubber floor mat on which the user may stand or rest his/her feet. Like the plastic deck, the rubber floor mat comprises respective openings for the seat post and for fastening of the conical coupling assembly. Unlike the floor deck, the rubber mat covers the battery box. In the preferred embodiment, the rubber floor mat will have a slit between the back of the mat and the seat-post hole wherein the entire mat need not be removed when removing or installing the seat-post.

The third part of the conical coupling assembly is part of the chassis frame and is centered and flush to the upper front of the frame comprising a downward facing female receiving end that respectively couples to the conical coupling assemblies second component (the upward vertical facing conical male end) The downward facing female receiving end comprises a threaded hole with a diameter equal to the diameter of the upper of the upward vertical facing conical male end.

Referring now to the conical coupling assembly-this assembly is an integral part to fully complete the invention presented here. Coupling frame structures together is not a new concept, but the systems and components to which they are connected are. Let us walk through the assembly of Major part 1 (front steering assembly) to Major part 2 (rear chassis assembly). In the preferred embodiment, the user simply drops the two legs of the telescopic stand assembly by loosening the two wing screws-the legs drop to the ground and may be adjusted for optimum balance and then the wing screws are tightened. Or, the kick stand assembly is lowered to make a footing with the ground. Major part 1 is now standing by itself at the perfect height to couple with major part 2 wherein the upward vertical facing conical male end of the conical coupling assembly is ready to receive part 3 (the downward facing female receiving end) of the conical coupling assembly. The user now easily lines up the rear chassis assembly to the front steering assembly, tilts the rear chassis back so that part three (female receiving end) of the conical coupling assembly is over part 2 (the upward vertical facing conical male end) of the conical coupling assembly, and lowers the chassis onto the steering assembly. In the preferred embodiment, the user tilts the chassis back by grasping the seat with both hands, places a foot on the back of the floor deck, and pivots the rear chassis back, using the rear wheels as the pivot point-this requires no bending over and makes it much safer and easier for users who have disabilities, are older, or are frail. Or, the rear chassis, without the seat installed, may be coupled to the steering assembly by the user grabbing the chassis frame with one hand and maneuvering it onto the steering assembly. What is so novel and revolutionary about the conical coupling assembly is that unlike the prior art, the cone shaped, male and female ends do not require the parts to be perfectly vertically aligned when trying to couple. Due to the cone shape, the user simply needs to place the female end over the general vicinity of the male end and lower-the male and female ends will automatically align themselves due to the slope of the conical shape. In addition, unlike the prior art, because the male and female ends are machined to fit each other, there is no room for movement or rocking in the conical coupling assembly. As a matter of fact, once coupled, the weight of the user standing on the floor deck locks the conical coupling assembly so tightly, that the special double ended hand screw (which we will discuss later) does not need to be used the keep the coupling together.

Because the invention presented here is designed to be simple and easy to use, tools are not required to assemble or reassemble it. Referring back to the conical coupling assembly, once the upward vertical male conical end and the female receiving end are coupled, they are secured together with a special double ended hand screw comprising a narrower threaded end that fits into the upper of the upward vertical facing male conical end's internal threads, securing the conical coupling assembly together comprising, a larger diameter cylindrical disc, wherein a U-shaped handle is pivotally mounted and comprises a threaded end facing the opposite direction of the narrower threaded end, with a diameter equal to the upper of the upward vertical facing conical male end. The U-shaped pivoting handle is used to provide leverage to secure or release the conical coupling assembly, and when not in use, pivots and lies flat on the floor deck. The pivoting lever also acts as a safety while lying flat wherein in the event the securing screw may loosen, the pivot lever can go no further than the point it hits the rear and downward facing curved frame support member, thus ensuring complete safety. And though it may never be used, the wider threaded end of the double ended hand screw, with a diameter equal to the upward vertical facing conical male end, will help release and or separate the conical coupling assembly when a user screws it into the upper of the downward facing female receiving end. The invention presented here has been thought out so well, that anticipated issues over time are addressed making it a truly novel EMV. Over time, any coupled joint that is exposed to the elements may become a victim of dirt, corrosion, rust, etc. In normal operation the conical coupling assembly couples as easy as it uncouples-unscrew the double ended hand screw, tilt the chassis back and done. But in the event the coupled conical coupling assembly becomes stuck due to lack of use, dirt, corrosion, rust etc. the user simply flips the double ended hand screw over and uses the wider threaded end to release and separate the assembly.

Referring to minor part 2 (seat-post and seat) and continuing with the idea of no tools required and easy transport, the seat-post comprises a tubular post comprising an eccentric clamp at the top, a horizontal rectangular mounting plate located approximately 2 inches from the bottom of the post comprising, 4 equally spaced holes for hand screws at each corner. The rectangular mounting plate respectively fits over the rectangular seat post bracket in the chassis frame and the remaining 2 inches of tubular pipe slides into the receiving hole in the center of the seat post mounting bracket. A seat with a downward facing tubular post will fit inside the upper of the seat post and is secured with the eccentric clamp. Height of the seat may be adjusted by inserting removable pins into holes in the seat post that would correspond to holes in the downward post of the seat. In the invention presented here, the seat and seat post are easily removed. Because the bottom of the seat post fits securely into the recessed frame, it can be used without fasteners, and for those who prefer extra tightness, or to keep the seat post from lifting out, the seat-post may be fastened by using screws with finger grip heads, requiring no tools. Depending on how the user mounts the seat-post, it can be removed as quickly as 1 second, or with finger screws, around 15 seconds. The seat-post's height and location on the chassis permits the user to stand or sit comfortably without needing to remove the seat-post nor requiring bulky and complicated folding seat post mechanisms. Accordingly, in the preferred embodiment, the seat post will be installed and allows the user the flexibility and choice of whether to stand, sit, or a combination thereof and which does not limit groups of populations that the prior art with stand only or sit only EMV's focus on.

Referring now to minor part 1 (removeable battery box). The removable battery box comprises a plastic housing, comprising a rubber top to cover a battery, comprising two electrical connectors-one connector to supply power from a battery to Major part 1, the other connector to function as the charge port, and comprising a strap over the top of the battery box wherein the user may easily remove the battery box from the EMV with one hand. In the preferred embodiment, an additional charge port is mounted on the floor deck, then wired and connected to the charge port of the battery box. It should be noted that depending on the needs and requirements of the user, the choice of batteries placed in the battery box may vary in weight and power density. Between lithium and lead acid batteries, the battery can weigh as little as 10 lbs or as much as 38 lbs. The removable battery box enables most users, no matter how weak or strong, to remove the battery. In any event, should the user desire to transport the invention presented here, and deems major part 2 is too heavy to lift, the user simply, unplugs the power line from the battery box, lifts the rubber mat up, grasps the battery box strap, and pulls the battery box out. The process takes less than 10 seconds, reducing the weight of Major part 2 by 10-38 lbs. In addition to reducing the weight for transport, an easily removable battery box also enables users to charge the battery outside the EMV which is a big plus for all type users providing them with flexibility of where to charge. In addition, users have the option to purchase additional battery boxes for charging outside the EMV wherein a fully charged battery is ready to swap out a depleted battery pack in seconds. This reduces any driving downtime needing to wait for a battery to be charged which is a huge plus for all users and especially for industrial users, and scooter rental purposes. It should be noted, that the battery pack is designed to be hidden under the floor deck. This is for a couple of reasons:

1. This allows the floor deck to be flat-a flat floor deck is key to targeting the 3 populations discussed here:
  (A) First, persons with walking disabilities often have pain and trouble lifting their legs. Many EMV's have batteries mounted on top of the floor decks which require the user to lift his/her legs over the battery when mounting or dismounting the vehicle. In addition, there is less room for the user's feet to be comfortably placed.
  (B) Second, persons who will use the EMV presented here as a form of recreation also Benefit from the flat floor deck because like persons with disabilities, they find that the extra space is more comfortable plus it is more streamline not having a bulky battery in view.
  (C) Third, industrial users-along with users that have walking disabilities and recreational users, the added real estate that a flat deck provides allows users to place boxes and other forms of cargo, or even an additional passenger on the deck (especially with the seat post removed) and can move their cargo quickly and efficiently.

2. Second, the batteries' low center of gravity provides extra stability which translates to a better ride and better safety from tipping.

BRIEF DESCRIPTION OF THE DRAWINGS

FIG. 7 is a perspective view of the front Major part (front steering assembly) with an Exploded view of the upward vertical male conical end and telescopic stand assembly.

FIG. 13 is a left side view of Major part 1 (front steering assembly).

FIG. 14 is a rear view of Major part 1 (front steering assembly) with detail view of mounted electric controller with a rabbet joint.

FIG. 15 is a top left perspective of Major part 1 (front steering assembly).

DETAILED DESCRIPTION

Figure 1:
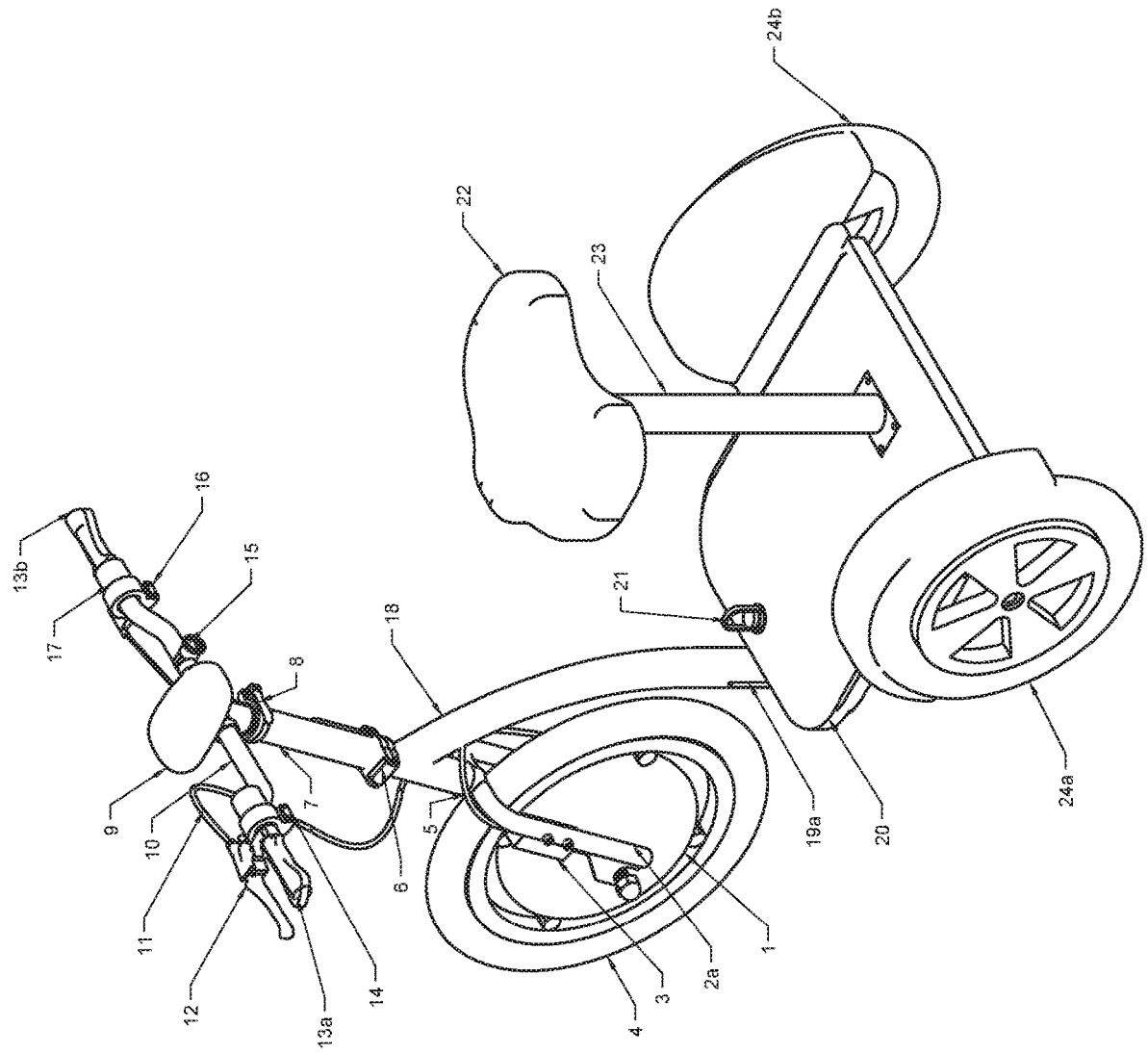
FIG. 1 is a perspective of the electric mobility vehicle of the present invention.

The new and improved invention presented here (FIG. 1 FIG. 2) is a transportable, battery powered, three wheeled electric, mobility vehicle comprising a unique coupling assembly between the two major parts of the EMV using a conical coupling assembly, a stand system, wherein the EMV may be quickly and safely assembled and disassembled into two major parts, and with the quick and easy option of breaking down the $2^{nd}$ major part into three smaller lighter parts, wherein most users may easily lift individual parts to store or transport into most locations or vehicles. More specifically:

FIG. 1 is a rear side perspective view of the present invention and starting at the top, the preferred handlebar steering assembly 10 mounted inside the steering column folding structure 7; steering assembly 10 comprises a left grip 13a and moving right, a hand brake 12 connected to a brake cable 11, a horn button 14, moving to the center, a key activated ignition headlight instrument 9, and continuing right, a dual USB charge port 15 to charge cell phones or tablets, a forward/reverse button 16 to allow respective movement directions, a twist throttle 17 in which both forward/reverse button 16 and twist throttle 17 connect to the electric controller 3 through an electrical wire, and right grip 13b.

Moving downward from handlebar assembly 10, the steering column folding structure 7 comprises an eccentric clamp 8 at the top that allows for height adjustment of the handlebar assembly 10, comprising a hollow tube, comprising a hinged folding mechanism 6 to allow handlebar assembly 10 to easily fold downward.

Folding structure 7 which includes both eccentric clamp 8 and hinged folding mechanism 6, connects to the lower steering column and steering fork 2a and 2b respectively. Moving down fork 2a comprises a rabbet joint in the fork that mates flush, and seen more clearly in FIG. 13,14,15, electric controller 3 with respective rabbet joints in which electric controller 3 is mounted to fork 2a. Power and all corresponding handlebar wiring interconnects through wire harness 5 which runs through the rear and downward facing hollow curved frame support member 18 to the top of electric controller 3. Electric controller 3 connects to the front electric hub motor 1 in which a tire 4 is mounted. At the lower end of fork 2a, and seen from FIG. 2, fork 2b, electric hub motor 1 which comprise threaded axles running horizontally through it, mounts to respective left and right fork flanges with nuts. On the right side of electric hub motor 1, and as seen from FIG. 2, brake cable 11 connects to drum brake lever 25 completing the brake system.

Figure 2:
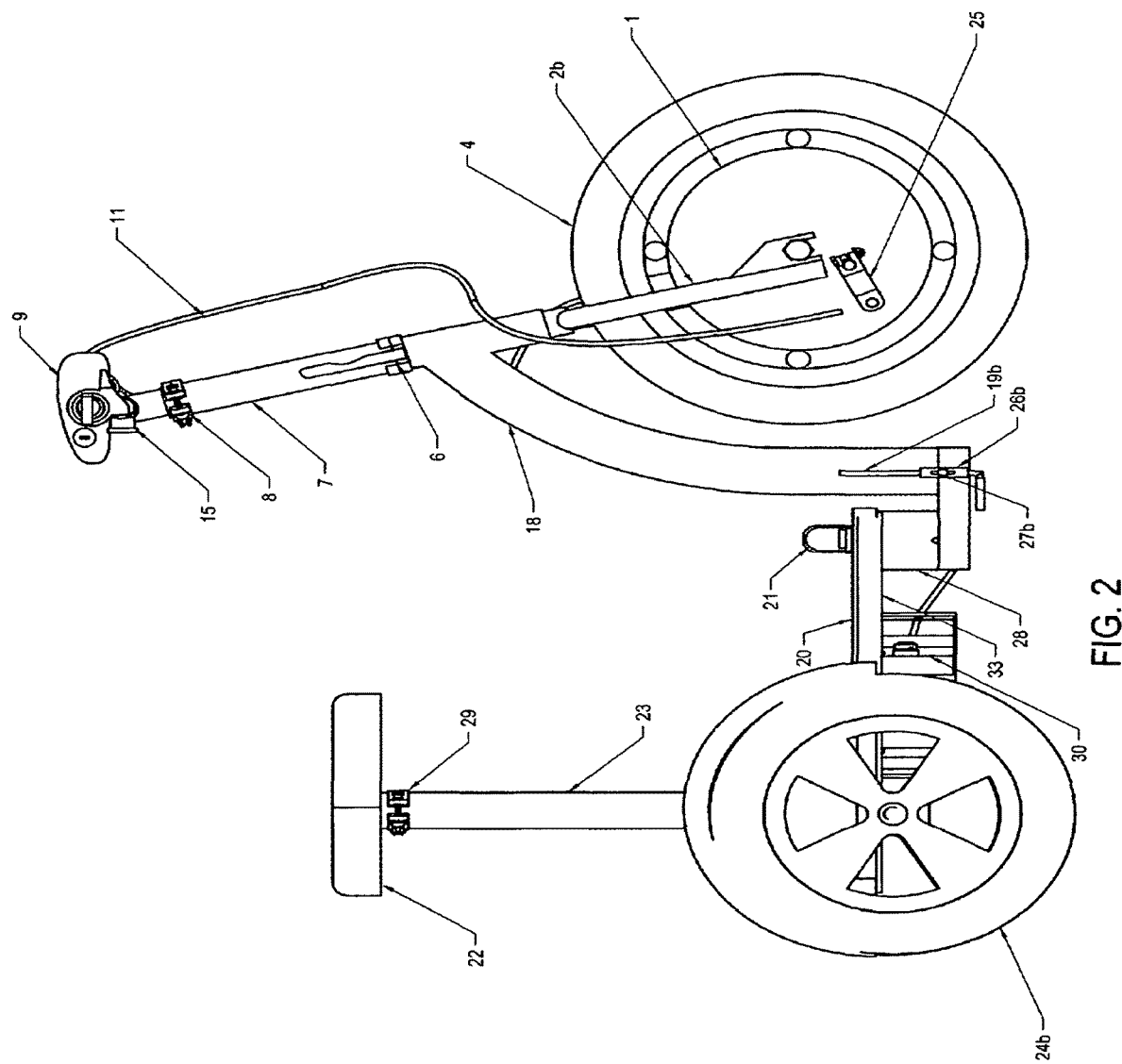
FIG. 2 is a side elevation of the present invention.

Referring back to the rear and downward facing curved frame support member 18 mentioned earlier, the upper portion of member 18, vertically attached to the steering column frame, curves downward, and at the base, comprises the stand system seen in FIG. 2 and more clearly in FIG. 7, comprising telescopic "L" shaped legs 19a,19b, comprising respective hollow tubes 26a,26b that "L" shaped legs fit through and that have respective centered and horizontal threaded holes comprising wing screws 27a,27b that fit the respective horizontal threaded holes.

Attached to the lowest of the downward facing curved frame support member 18, comprises rear facing horizontal hollow beam 32, comprising a special upward vertical facing male conical end 31 and best seen in FIG. 3,4,5,6,7. This completes Major part 1 (front steering assembly).

Figure 8:
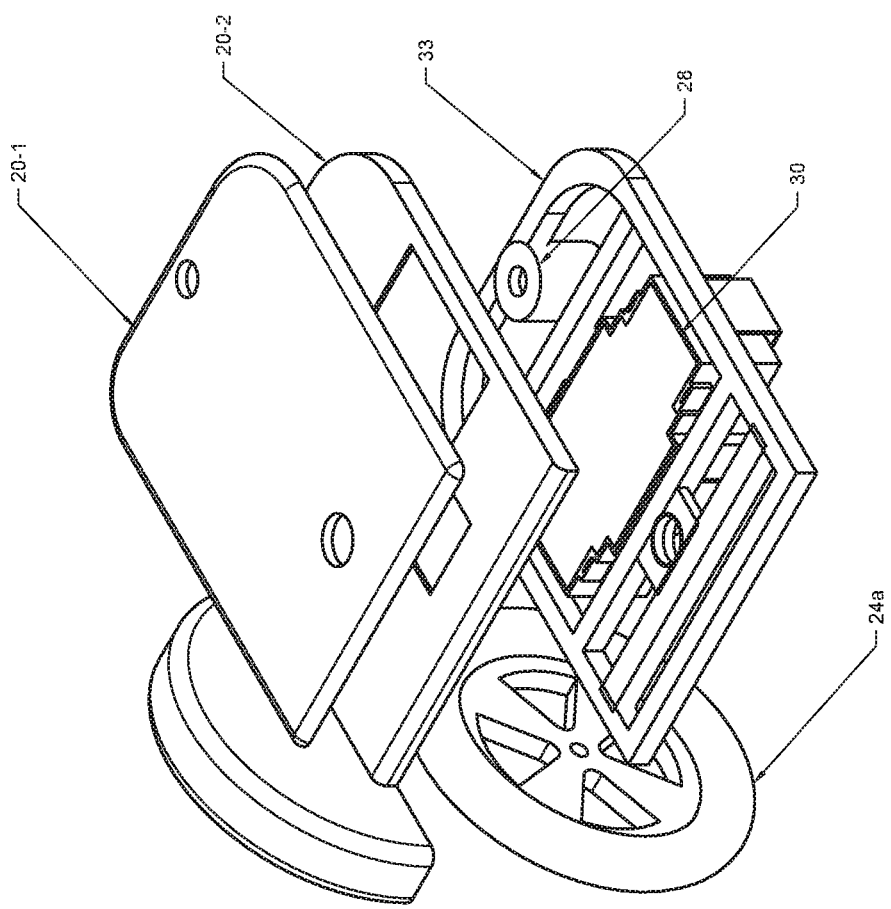
FIG. 8 is an exploded perspective view of Major part 2 (rear chassis assembly) and battery box.

Continuing to the lower rear portion of the presented invention, FIG. 1 generally shows the floor deck 20 which comprises and better viewed in FIG. 8,9, a rubber floor mat 20-1, injection molded plastic floor deck 20-2, metal frame 33 to support the platform and house the battery box 30, removable seat post 23, removable/adjustable seat 22, left wheel 24a, right wheel 24b, special double ended hand screw 21.

FIG. 2 illustrates the hidden views that are hidden in perspective FIG. 1 which comprise, seat post eccentric clamp 29, locking lever for folding structure mechanism 6, drum brake lever 25, all components previously mentioned under floor deck 20 and more importantly, the last component of the conical coupling assembly, female receiving end 28 which can also be seen in FIG. 3,4,5,6,8,9,16.

Figure 3:
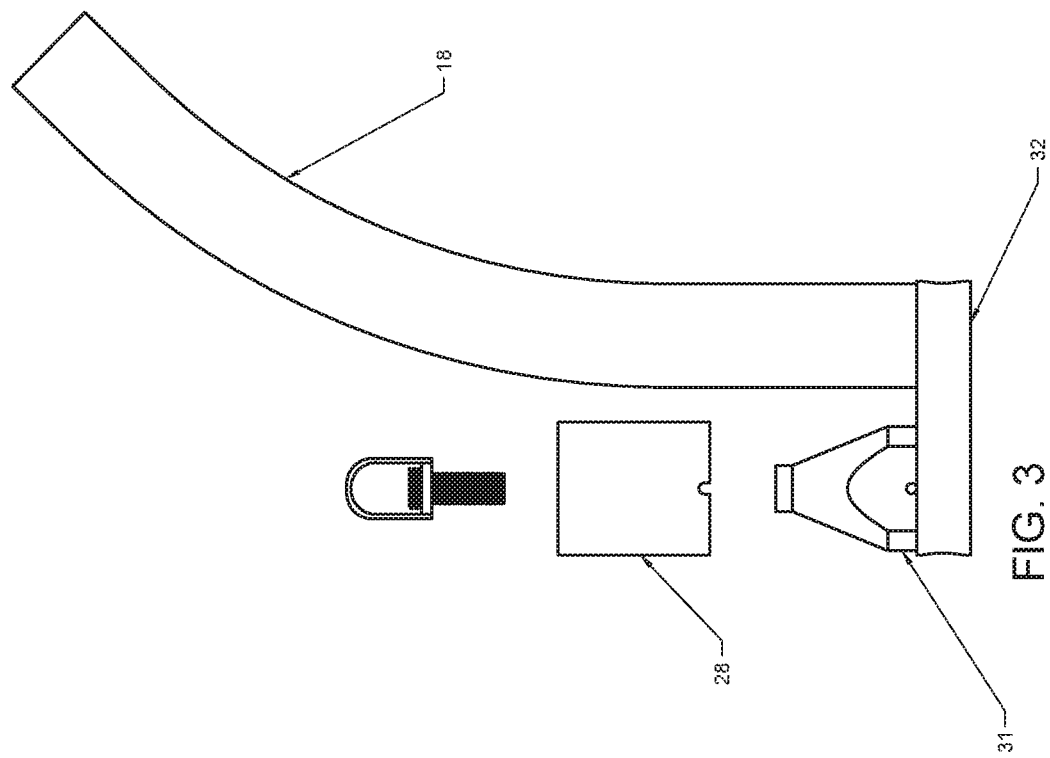
FIG. 3 is an exploded side view of the conical coupling assembly and rear and downward facing curved frame support member.

FIG. 3 shows an assembled side view of the special upward vertical facing conical male end wherein rear and downward facing curved frame support member 18, horizontal hollow beam 32, and upward vertical facing conical male end 31 are all combined and lined up to accept the downward facing female receiving end 28, to which special double ended hand screw 21 will complete the assembly. Once coupled, it is easy to see how Major part 1 (front steering assembly) and Major part 2 (rear chassis assembly) will couple so securely and comprehensively.

Figure 4:
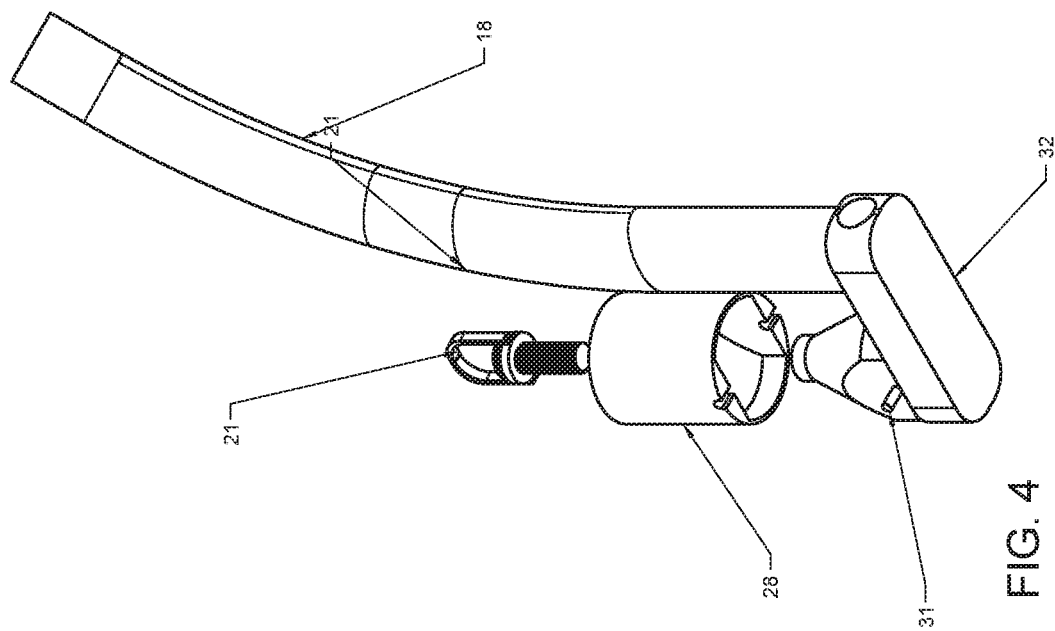
FIG. 4 is a perspective exploded view of the conical coupling assembly and rear and downward facing curved frame support member.

FIG. 4 respectively shows a perspective view of FIG. 3 which shows more of the special conical coupling assemblies' architecture.

Figure 6:
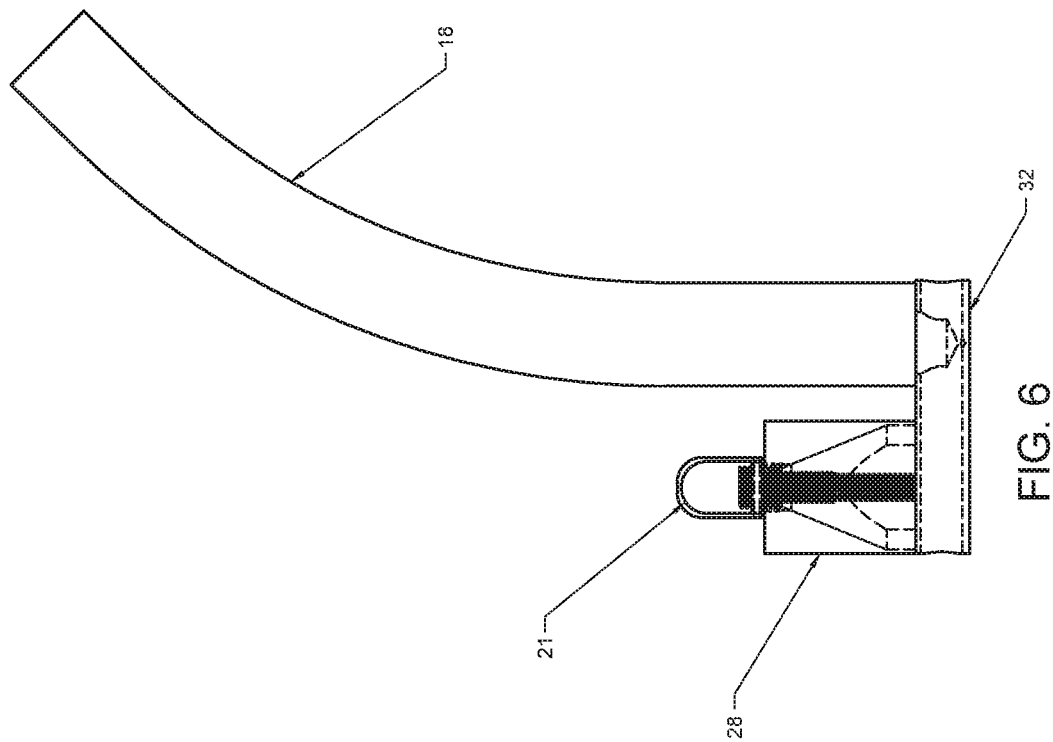
FIG. 6 is a side view with hidden lines of the assembled conical coupling assembly and rear and downward facing curved frame support member.
Figure 5:
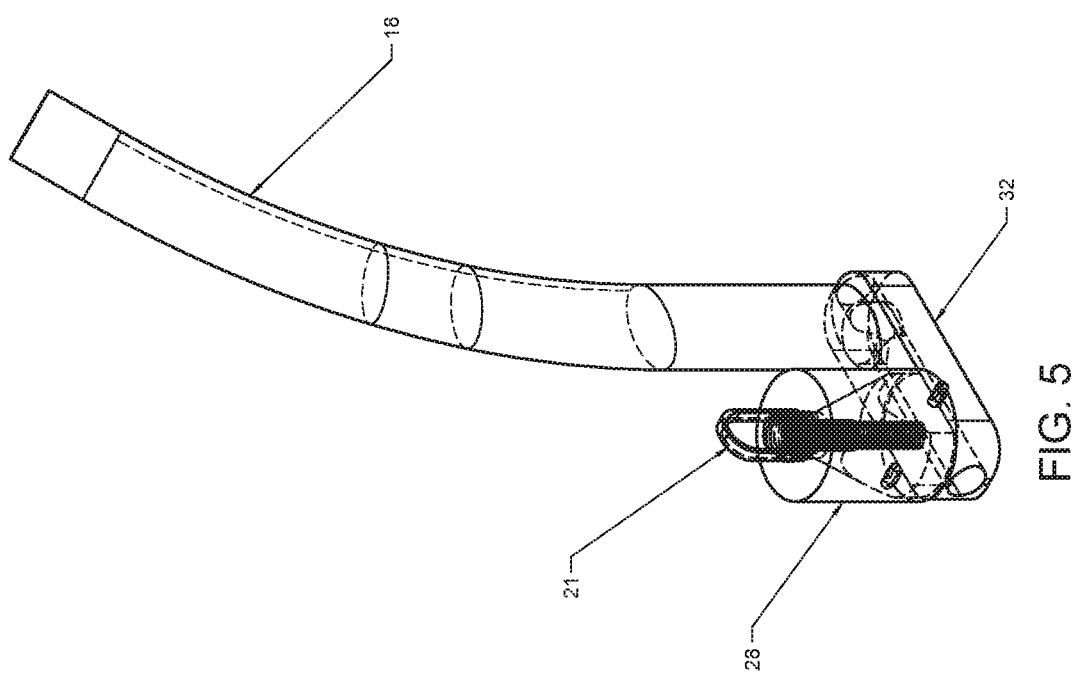
FIG. 5 is a perspective view with hidden lines of the assembled conical coupling assembly and rear and downward facing curved frame support member.

FIG. 5 perspective and FIG. 6 right hand elevations illustrate even further, the rear and downward facing curved frame support member 18, horizontal hollow beam 32, upward vertical facing male conical end 31 (hidden lines), female receiving end 28, and special double ended hand screw 21 interrelate so perfectly in their assembled and hidden line views.

FIG. 7, referred to earlier in FIG. 2's description depicts Major part 1 (front steering assembly) freely standing upright using the special telescopic stand system. As illustrated, in FIG. 2 and assembled, telescopic L-shaped legs 19a and 19b are in the upright position and the feet of the L-shaped legs are positioned to face the rear of the EMV, out of the way and secured tightly by respective wing screws 27a,27b. To apply the telescopic stand system, switching from FIG. 2 illustration and setting it up in FIG. 7 illustration, the user simply loosens wing screws 27a and 27b respectively, the L-shaped telescopic legs, 19a and 19b drop to the ground at the perfect height, through respective telescopic tubes 26a and 26b. Though not necessary, the user may twist the L shaped legs 90 degrees out for optimum stability of Major part 1 (front steering assembly) and gently tighten wing screws 27a and 27b. With the steering assembly in the standing upright position, the user is free to solely manipulate Major part 2 (rear chassis assembly) into place securing the conical coupling assembly and forming a complete vehicle.

Figure 9:
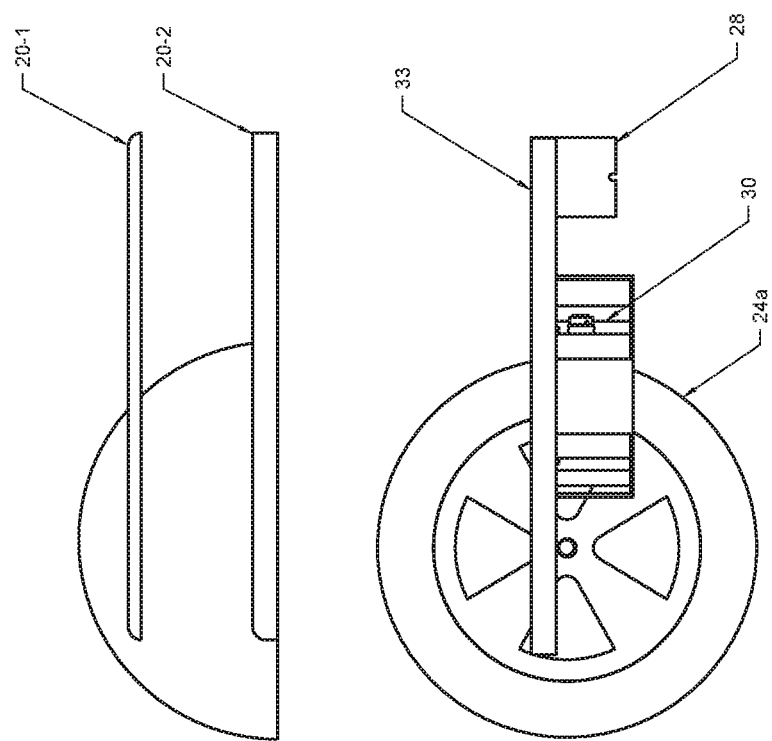
FIG. 9 is an exploded side view of Major part 2 (rear chassis assembly) and battery box.

FIG. 8 perspective and FIG. 9 right side views respectively illustrate exploded and layered views of Major part 2 (rear chassis assembly) and for further clarity, minus seat post 23, seat 22, right wheel 24b, right fender of plastic floor deck 20-2, and the rear axle. From top to bottom, the layers comprise a rubber floor mat 20-1 with openings to allow special double ended hand screw 21 and seat post 23 to pass through, a plastic injection molded floor deck 20-2 with respective openings to allow special double ended hand screw 21, battery box 30, and seat post 23 to pass through.

Figure 11:
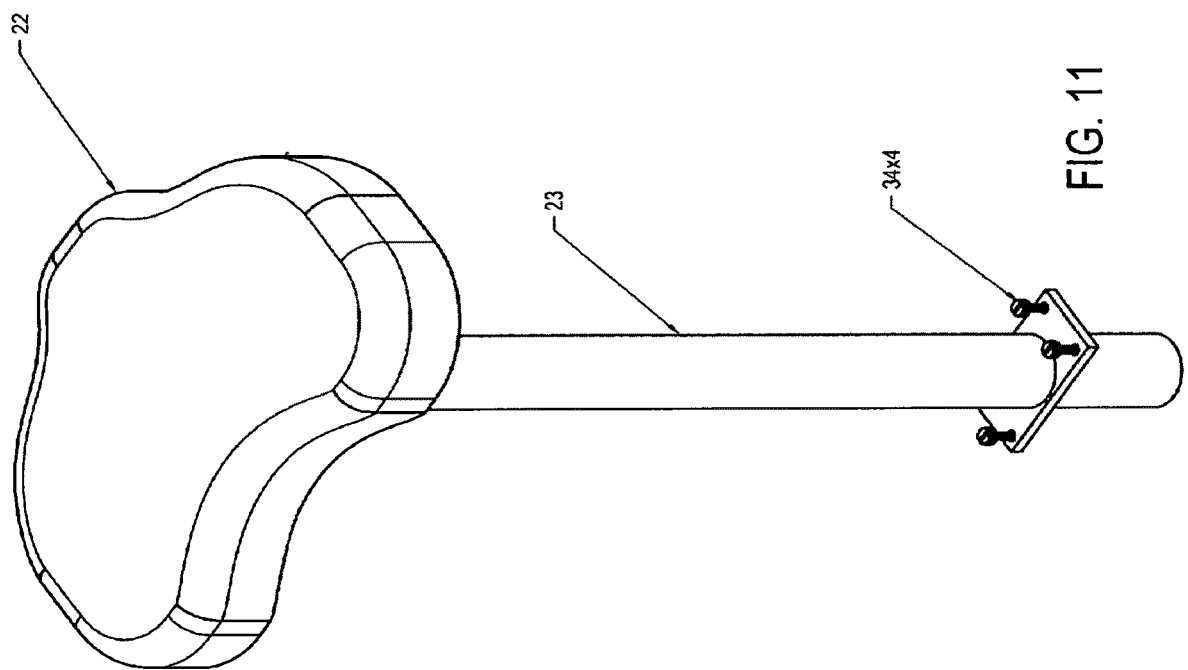
FIG. 11 is a perspective view of the removable seat-post with seat.
Figure 10:
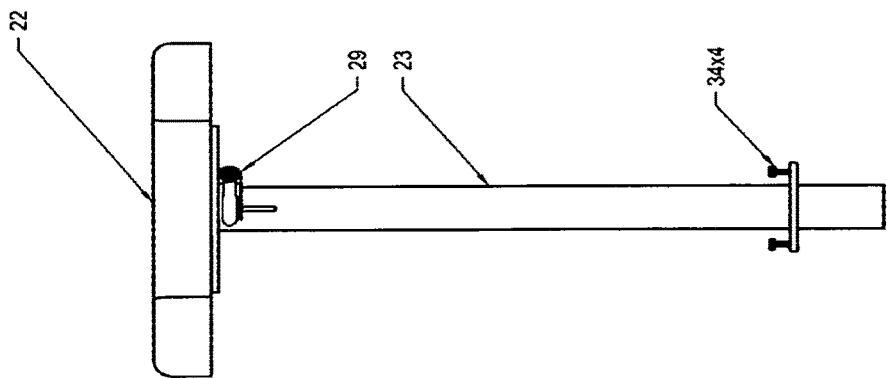
FIG. 10 is a side view of the removable seat-post with seat.

FIG. 10 right side view FIG. 11 perspective view, illustrate the easily removable seat-post 23 comprising a hollow metal tube with an eccentric clamp 29 at the top to secure seat 22, comprising a rectangular mounting plate approximately two inches from the bottom, comprising four holes at each corner of the rectangular mounting plate, respectively comprising four hand grip screws (Minor part 2).

The removable seat and seat-post adds to the versatility of the invention presented here. In a related embodiment there is no seat-post 23 and seat 22. This embodiment depicts a stand up only EMV. The preferred embodiment will include seat post 23 and seat 22. Adhering to the idea of portability and versatility, seat-post 23 together with seat 22 weighing less than 5 lbs, slides into a receiving hole in the chassis frame and need not be secured with screws to be functional. Installation and removal takes only seconds. In a related embodiment, and adding 10-15 seconds to installation/removal, seat-post 23 and seat 22 may be additionally secured with hand screws, requiring no tools to screw in or out and would typically be applied when the user is not planning on removing seat-post 23 and seat 22 very often.

Figure 12:
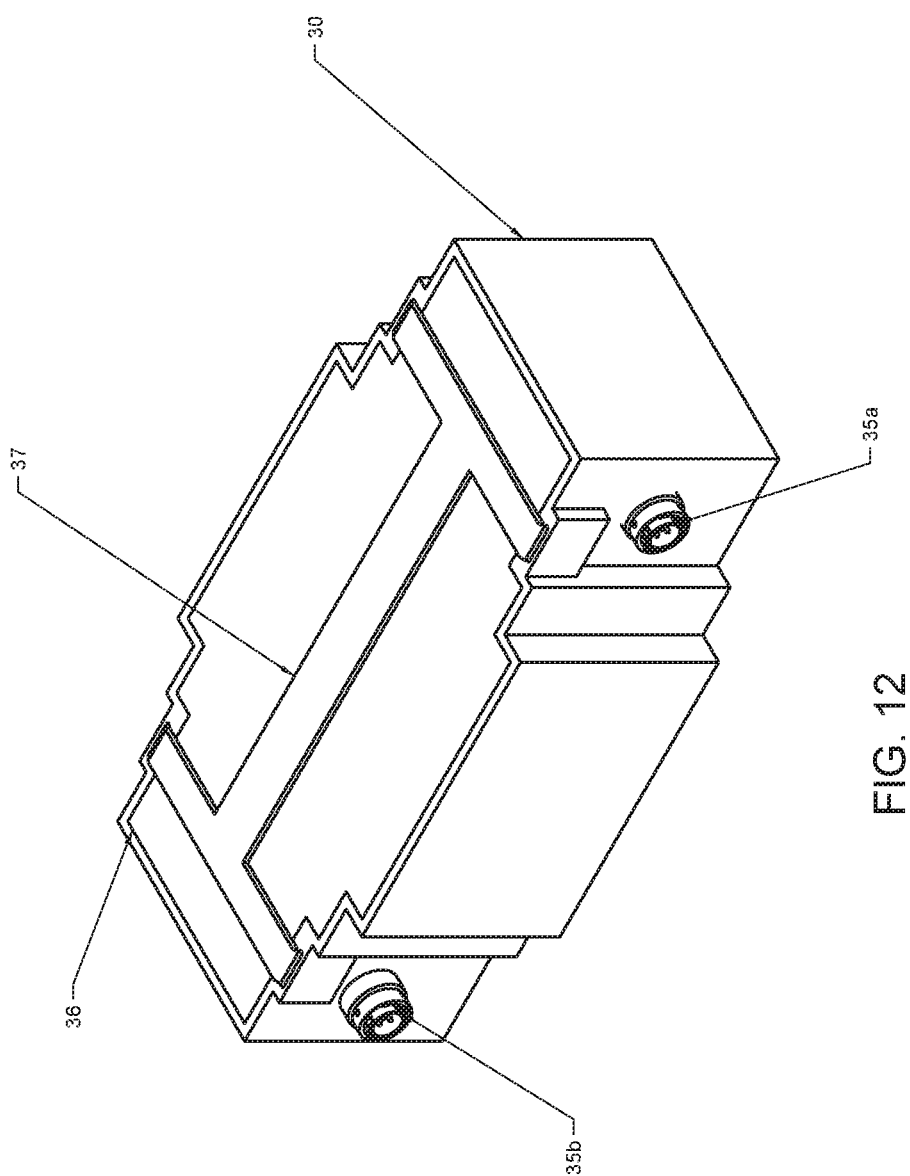
FIG. 12 is a perspective view of the removable battery box.

FIG. 12 removable battery, comprises plastic battery box 30, comprising electrical connectors 35a and 35b whereas 35b is a charge port and whereas 35a is the power connector to which a wire from Major part 1(front steering assembly) will interconnect the battery to the electric controller, comprising a durable rubber top 36 to cover the battery, comprising strap 37 for lifting the battery box 30 in and out of deck frame 33. Accordingly, the battery housed in the battery box 30 (Minor part 1) which, depending on the type of battery, ie. Lithium or sealed lead acid, may weigh as Little as 10 lbs or up to 38 lbs provides a driving range of up to 30 miles. Besides adhering to the principle of portability ease by providing the user the option to reduce the weight of Major part 2 by 10-38 lbs, an easily removable battery box 30 allows the user to charge the battery away from the EMV which benefits not only individual users, but to rental, and industrial users who may want to have spare charged battery packs ready to swap out when the current battery is exhausted, thus reducing down time and increasing efficiency.

FIG. 13, 14,15 show left side, rear, and perspective views respectively and focus on electric controller with rabbet joint 3 coupling with left fork 2a's respective rabbet joint. Detail A of FIG. 14 shows an enlarged view with hidden lines clarifying how neatly electric controller with rabbet joint 3 couples to fork 2a. Though it may seem trivial, this is important for a number of reasons:

1. For a quick assembly or disassembly system to be efficient, Major part 1 and Major part 2 must have very few connections between each other. Electric controller with rabbet joint 3 mounted on Major part 1 leaves only a single wire to connect or disconnect when assembling or disassembling Major part 1 to and from Major part 2.
2. Because electric controller with rabbet joint 3 is mounted close to the motor and close to the wiring harness, there is less chance for damaging wires and less wiring heat up during operation.
3. Diagnostic, repair, and replacement is much easier with electric controller with rabbet joint 3 mounted externally.
4. Because it is almost invisible, taking up no room on the handlebars nor steering column, the flush mounted electric controller with rabbet joint 3 coupled to fork 2a is an improvement that will provide a greater chance for commercial success in all populations targeted.

Figure 16:
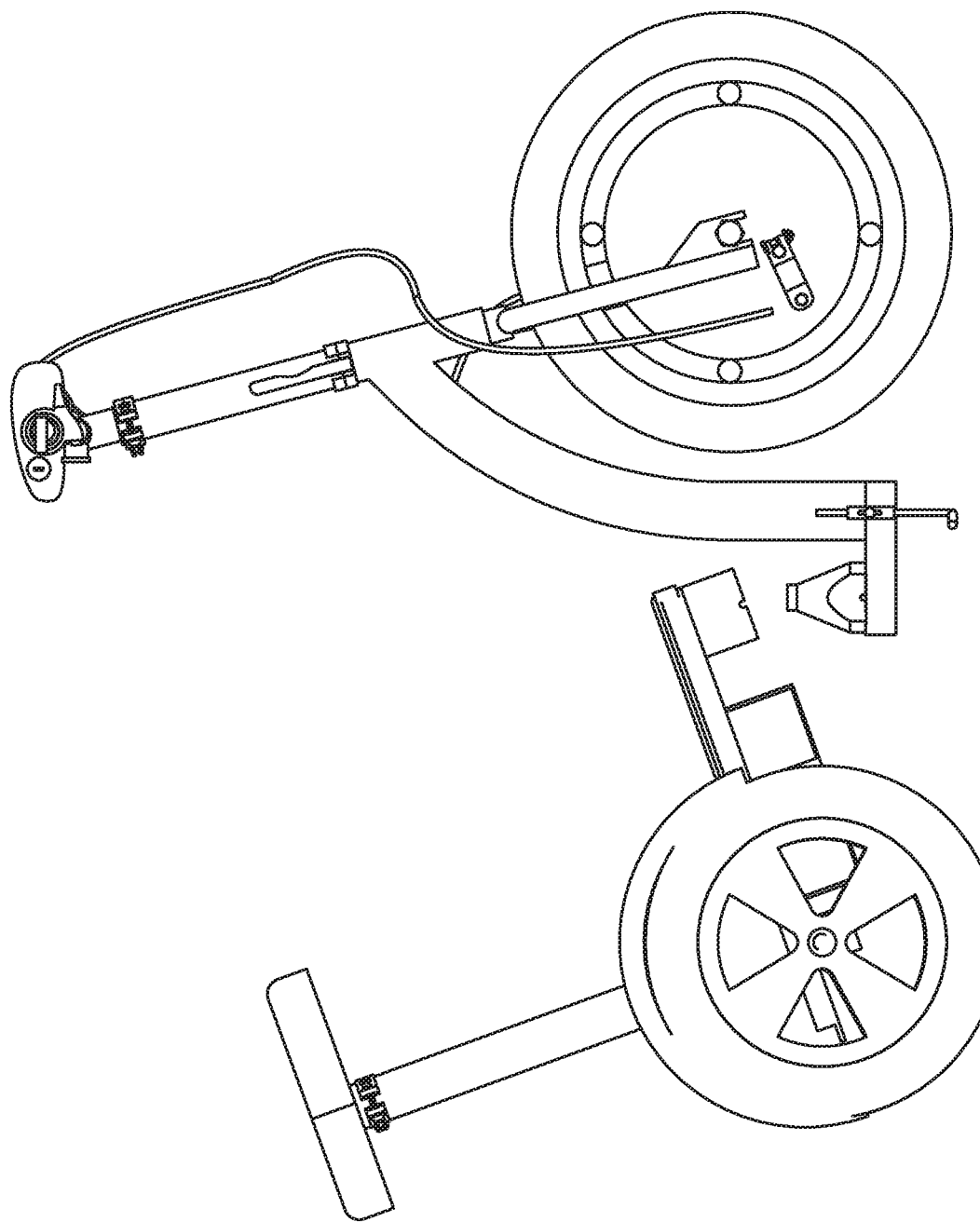
FIG. 16 is a side elevation of the present invention showing Major part 2 (rear chassis assembly) positioned to connect to Major part 1 (front steering assembly).

FIG. 16 shows in the preferred embodiment, Major part 2 in a tilted back position and lined up to connect with Major part 1 and in which the telescopic stand system is applied, allowing Major part 1 to stand freely at the perfect height to easily couple downward facing female receiving end 28 onto upward vertical facing male conical end 31. In the preferred method, the user grasps seat 22 with his/her hands, and while one foot is positioned on the rear of floor deck 20, tilts Major part 2 (rear chassis assembly) back, aligns with Major part 1 (front steering assembly) and lowers, thus coupling Major part 2 with Major part 1 and forming a complete vehicle once electrically connecting battery box 30 to electric controller with rabbet joint 3. In another related method of coupling, the user aligns Major part 2 with Major part 1 by bending down and simply lifting the front of Major part 2 with one hand and setting it on Major part 1.

Note that as extensive as the summary and description have been, it must be taken as an example only and that the embodiments are simply illustrated of the main principles of the invention, thus they do not limit the process presented herein, since numerous additional modifications, changes, and additions may be made by skilled persons in the area of art, within the category of said principles, and which will embody those principles, falling within the spirit, concept, and scope of this invention.

What is claimed:

1. A multi-use, easy to disassemble or assemble, transportable three-wheel electric mobility vehicle, comprising:
   a chassis assembly;
   a steering assembly rotatably coupled to a rear and downward facing curved frame support member that is coupled to the chassis assembly;
   a telescopically adjustable handlebar coupled within a folding structure to adjust a steering height enabling the coupled folding structure and telescopically adjustable handlebar to fold down for easier transporting or stowing;
   a plurality of controls and components coupled to the telescopically adjustable handlebar, in which the plurality of controls and components include a throttle, a forward and reverse switch, a horn, a brake lever, a headlight, and a USB charge port;
   a left leg and a right leg of a steering fork coupled to the steering assembly below the folding structure;
   a front electric wheel motor assembly coupled to the steering assembly and configured to be rotated by the steering assembly for steering the vehicle, in which the front electric wheel motor assembly comprises:
      a brake system coupled to the front electric wheel motor assembly;
      an electrical pathway from the front electric wheel motor assembly to an electric controller; and
      a tire coupled to the electric wheel motor assembly;
   a removable seat post and seat coupled to the chassis assembly;
   a floor assembly coupled to the chassis assembly for a user to stand on, comprising:
      a removable rubber floor mat coupled to the top of the floor assembly;
      a floor deck below the rubber floor mat with respective fenders to cover a rear left wheel and a rear right wheel of the chassis assembly;
      a removable panel under the floor assembly to access a battery;
      the battery housed within a removable battery box located below the removable panel under the floor assembly and coupled to the chassis assembly; and
      an electrical pathway from the battery to the electric controller.

2. The electric mobility vehicle according to claim 1, further comprising:
   a stand assembly that allows the steering assembly, the front wheel motor assembly, and the rear and downward facing curved frame support member, to stand upright and independently from the chassis assembly, in which the stand assembly includes a telescopic leg stand assembly or a kick stand assembly.

3. The electric mobility vehicle according to claim 1, wherein a conical coupling assembly couples the rear and downward facing curved frame support member to the chassis assembly.

4. The electric mobility vehicle according to claim wherein the conical coupling assembly comprises:
   a horizontal hollow beam perpendicularly attached and extending back from a bottom of the rear and downward facing curved frame support member;
   an upward vertical facing conical male end attached to a rear of the horizontal hollow beam wherein the upward vertical facing conical male end has a cylindrically shaped top, progressing downward to an enlarging diameter cone, progressing downward to a cylindrical shaped bottom with a diameter equal to a largest diameter of the cone;
   a vertical threaded hole bored through the center of the upward vertical facing conical male end;
   a left horizontal alignment peg extending out from a left lower side of the upward vertical facing conical male end;
   a right horizontal alignment peg extending out from a right lower side of the upward vertical facing conical male end;
   a downward facing female receiving end mounted on a front end of the chassis assembly that couples with the upward vertical facing conical male end and respective left and right horizontal alignment pegs;
   a hand screw threaded to fit threads of the vertical threaded hole of the upward vertical facing conical male end wherein the hand screw secures the coupled upward vertical facing conical male end with the downward facing female receiving end.

5. The electric mobility vehicle according to claim 1, wherein:
   the electric controller mounts flush to the left leg or the right leg of the steering fork;
   the electric controller has a side notched with a rabbet joint, the rabbet joint having at least two holes that align with respective holes on the left leg or right leg of the steering fork;
   the left leg or the right leg of the steering fork is notched with the rabbet joint;
   an electric connector on a lower portion of the electric controller with the rabbet joint connects to an electrical pathway of the front electric wheel motor assembly; and
   an electric connector on an upper portion of the electric controller with the rabbet joint connects to a wiring harness and the battery.

* * * * *